US007813486B2

(12) United States Patent  
Vertaschitsch et al.

(10) Patent No.: US 7,813,486 B2
(45) Date of Patent: *Oct. 12, 2010

(54) METHOD AND APPARATUS FOR INTEGRATING PHONE AND PDA USER INTERFACES ON A SINGLE PROCESSOR

(75) Inventors: Ed Vertaschitsch, Bellevue, WA (US); Sean Mercer, Issaquah, WA (US); Gordon Onorati, Kent, WA (US)

(73) Assignee: Access Systems Americas, Inc., Sunnyvale, CA (US)

( * ) Notice: Subject to any disclaimer, the term of this patent is extended or adjusted under 35 U.S.C. 154(b) by 1329 days.

This patent is subject to a terminal disclaimer.

(21) Appl. No.: 11/301,568

(22) Filed: Dec. 13, 2005

(65) Prior Publication Data

US 2006/0095849 A1 May 4, 2006

Related U.S. Application Data

(63) Continuation of application No. 09/687,987, filed on Oct. 13, 2000, now Pat. No. 6,976,217.

(51) Int. Cl.
*H04M 11/00* (2006.01)
*G06F 3/00* (2006.01)
(52) U.S. Cl. ............... 379/93.17; 379/90.01; 379/93.05
(58) Field of Classification Search ............... 379/93.17, 379/90.01, 93.09, 93.05, 93.19, 93.23, 110.01, 379/419, 441, 442, 455, 456; 455/556, 557, 455/566, 555, 74; 715/717, 864, 771
See application file for complete search history.

(56) References Cited

U.S. PATENT DOCUMENTS

| 4,399,538 | A | * | 8/1983 | Cholakian et al. ............. 714/22 |
| 5,097,528 | A | | 3/1992 | Gursahaney et al. ..... 379/93.23 |
| 5,367,563 | A | | 11/1994 | Sainton ........................ 379/98 |
| 5,522,089 | A | | 5/1996 | Kikinis et al. ............... 345/864 |
| 5,633,890 | A | | 5/1997 | Ahmed ........................ 375/219 |
| 5,671,374 | A | | 9/1997 | Postman et al. ............. 395/309 |

(Continued)

FOREIGN PATENT DOCUMENTS

EP 0 930 793 7/1999

(Continued)

OTHER PUBLICATIONS

Bryan, Marvin, "Racal-Vadic 9632VP: 9600-bps V.32 modem (Hardware Review) (Evaluation)," *Macworld*, vol. 7, No. 8, Aug. 1990, pp. 198(2).

(Continued)

*Primary Examiner*—Melur Ramakrishnaiah
(74) *Attorney, Agent, or Firm*—Berry & Associates P.C.

(57) ABSTRACT

Separate processors, a PDA processor, and a baseband processor are maintained in a PDA having an integrated telephone device. The PDA processor runs PDA related programs and a user interface for the telephone device. A link between the PDA processor and baseband processor transfers data and commands from the user interface to a phone control program executing on the baseband processor. The base band processor is connected to the telephone device, and the phone control program controls operation of the telephone device. The separation of processors reduces vulnerability of the telephone device to hacker rogue applications that invade or program crashes that occur on the PDA processor.

34 Claims, 8 Drawing Sheets

U.S. PATENT DOCUMENTS

| | | | |
|---|---|---|---|
| 5,673,268 A | 9/1997 | Sharma et al. | 455/557 |
| 5,675,831 A | 10/1997 | Caputo | 395/830 |
| 5,699,350 A | 12/1997 | Kraslavsky | 370/254 |
| 5,724,529 A | 3/1998 | Smith et al. | 395/309 |
| 5,797,089 A | 8/1998 | Nguyen | 455/557 |
| 5,809,432 A | 9/1998 | Yamashita | 455/575 |
| 5,815,682 A | 9/1998 | Williams et al. | 395/500 |
| 5,946,634 A | 8/1999 | Korpela | 455/552 |
| 5,983,073 A | 11/1999 | Ditzik | 455/11.1 |
| 5,999,990 A | 12/1999 | Sharrit et al. | 710/8 |
| 6,032,203 A | 2/2000 | Heidhues | 710/11 |
| 6,084,584 A | 7/2000 | Nahi et al. | 345/329 |
| 6,092,133 A | 7/2000 | Erola et al. | 710/102 |
| 6,209,050 B1 | 3/2001 | Iho et al. | 710/101 |
| 6,219,787 B1 | 4/2001 | Brewer | 713/167 |
| 6,240,302 B1 | 5/2001 | Harrison | 455/556 |
| 6,266,539 B1 | 7/2001 | Pardo | 379/93.05 |
| 6,269,252 B1 | 7/2001 | Hutchings et al. | 455/552 |
| 6,295,645 B1 | 9/2001 | Brewer | 717/11 |
| 6,359,973 B1* | 3/2002 | Rahamim et al. | 379/93.05 |
| 6,389,124 B1 | 5/2002 | Schnarel et al. | 379/93.23 |
| 6,442,251 B1 | 8/2002 | Maes et al. | 379/93.23 |
| 6,516,202 B1 | 2/2003 | Hawkins et al. | 455/556 |
| 6,539,476 B1 | 3/2003 | Marianetti et al. | 713/100 |
| 6,587,961 B1 | 7/2003 | Garnett et al. | 714/11 |
| 6,625,472 B1 | 9/2003 | Farazmandnia et al. | 455/557 |
| 6,630,928 B1* | 10/2003 | McIntyre et al. | 345/173 |
| 6,633,759 B1 | 10/2003 | Kobayashi | 455/419 |
| 6,647,101 B2 | 11/2003 | Rahamim et al. | 379/93.05 |
| 6,731,951 B1 | 5/2004 | Takebe et al. | 455/557 |
| 6,754,313 B1 | 6/2004 | Quinton et al. | 379/90.01 |
| 6,754,509 B1 | 6/2004 | Khan et al. | 455/556.1 |
| 6,823,519 B1 | 11/2004 | Baird et al. | 719/313 |
| 6,907,265 B1 | 6/2005 | Holmstrom et al. | 455/557 |
| 2002/0012329 A1 | 1/2002 | Atkinson et al. | 370/330 |
| 2002/0057653 A1* | 5/2002 | Dolan et al. | 370/252 |
| 2003/0084206 A1* | 5/2003 | Floman et al. | 710/1 |

FOREIGN PATENT DOCUMENTS

| | | |
|---|---|---|
| JP | 07-066771 | 3/1995 |
| JP | 11-136305 | 5/1999 |

OTHER PUBLICATIONS

Danmore, Kelley, "Internal Modems for Portables and Laptops (Directory) (Buyers Guide)," *PC Week*, vol. 6, No. 42, Oct. 23, 1989, p. 118.

Drew, N.J. et al., "Reconfigurable mobile communications: compelling needs and technologies to support reconfigurable terminals," *IEEE International Symposium on Personal, Indoor and Mobile Radio Communications, PIMRC*, vol. 1, 2000, pp. 484-489.

Jackson, Al, "Hand-Held Devices for Avionics System Maintenance," Motorola, Inc., *IEEE*, 1997, pp. 489-502.

Krechmer, Ken, "Digital Signal Processing Creates the Next Generation of Modems (Includes a Related Article on Remote Troubleshooting and One on the Impact of ISDN) (Tutorial)," *Telecommunications*, vol. 24, No. 10, Oct. 1990, pp. 43(4).

Lettieri, Paul, et al., "Advances in Wireless Terminals," *IEEE Personal Communications*, Feb. 1999, pp. 6-19.

Moessner, K., et al, "Terminal reconfigurability—the software download aspect," *IEEE Conference Publication*, No. 471, 2000, pp. 326-330.

Nixon, Toby, "Design Considerations for Computer-Telephony Application Programming Interfaces and Related Components," *IEEE*, 1996, pp. 43-47.

Rosch, Winn L., "Sixpack of V.34 PCMCIA Modems Speed the Flow (Six 28.8Kbps PCMCIA Modems Reviewed) (First Looks) (Hardware Review) (Evaluation)," *PC Magazine*, vol. 14, No. 7, Apr. 11, 1995, pp. 50(2).

Rysavy, Peter, "PCCA Standards for Wireless Networks," *Mobile Commuting and Communications Review*, vol. 3, No. 2, pp. 17-19.

Strathmeyer, Carl R., "An Introduction to Computer Telephony," *IEEE Communications Magazine*, May 1996, pp. 106-111.

Truman, Thomas E., et al., "The InfoPad Multimedia Terminal: A Portable Device for Wireless Information Access," *IEEE Transactions on Computers*, vol. 47, No. 10, 1998, pp. 1073-1087.

Tucker, S. Paul, "HP Teleshare: Integrating Telephone Capabilities on a Computer Workstation (An Option Card for the HP 9000 Model 712 Workstation is HP's First Integrated Telephony Product) Includes a Related Article on Call Progress, DTMF Tones and Tone Detection in the TeleShare Card) (Technical)," *Hewlett-Packard Journal*, vol. 46, No. 2, Apr. 1995, pp. 69(6).

Umeno, Hiroo, "For the Telephony API, Press 1; for Unimodem, Press 2; or Stay on the Line (Abstraction Layer) (Technology Tutorial) (Tutorial)," *Microsoft Systems Journal*, vol. 13, No. 4, Apr. 1998, pp. 33(13).

Walters, R.E., "The missing link computer-supported telephony," *IEE Review*, Apr. 1992, pp. 151-154.

Weber, B., "A flexible multiservice ATM network interface using reconfigurable logic devices," *Proceedings of SPIE—The International Society for Optical Engineering*, vol. 3526, 1998, pp. 81-89.

\* cited by examiner

METHOD AND APPARATUS FOR INTEGRATING PHONE AND PDA USER INTERFACES ON A SINGLE PROCESSOR

CROSS REFERENCE TO RELATED APPLICATIONS

This application is a continuation application of application Ser. No. 09/687,987, entitled "Method and Apparatus for Integrating Phone and PDA User Interfaces on a Single Processor," filed Oct. 13, 2000, to be issued as U.S. Pat. No. 6,976,217, the subject matter in the above-identified and commonly owned application is incorporated herein by reference.

BACKGROUND OF THE INVENTION

1. Field of the Invention

This invention relates generally to user interfaces. The invention is more particularly related to user interfaces for phone and Personal Digital Assistants (PDAs). And, the invention is yet more particularly related to combining phone and PDA user interfaces on a single processing device.

2. Discussion of Background

Personal computer systems and their applications have become common tools in modern society. To organize their lives, many personal computer users use personal information management applications such as an address book and a daily organizer on their personal computers. Although such applications have proven useful for personal information management, their utility is limited by the fact that the person must be sitting at their personal computer system to access the information.

To remedy this limitation, palmtop computers, electronic organizers and other handheld devices, commonly known as personal digital assistants (PDA's), have been introduced. The PDA is a computer that is small enough to be handheld or placed in a pocket, and allows a user and run various applications including personal information management applications such as address books, daily organizers, etc. These applications make. people's lives easier.

Figure 1:
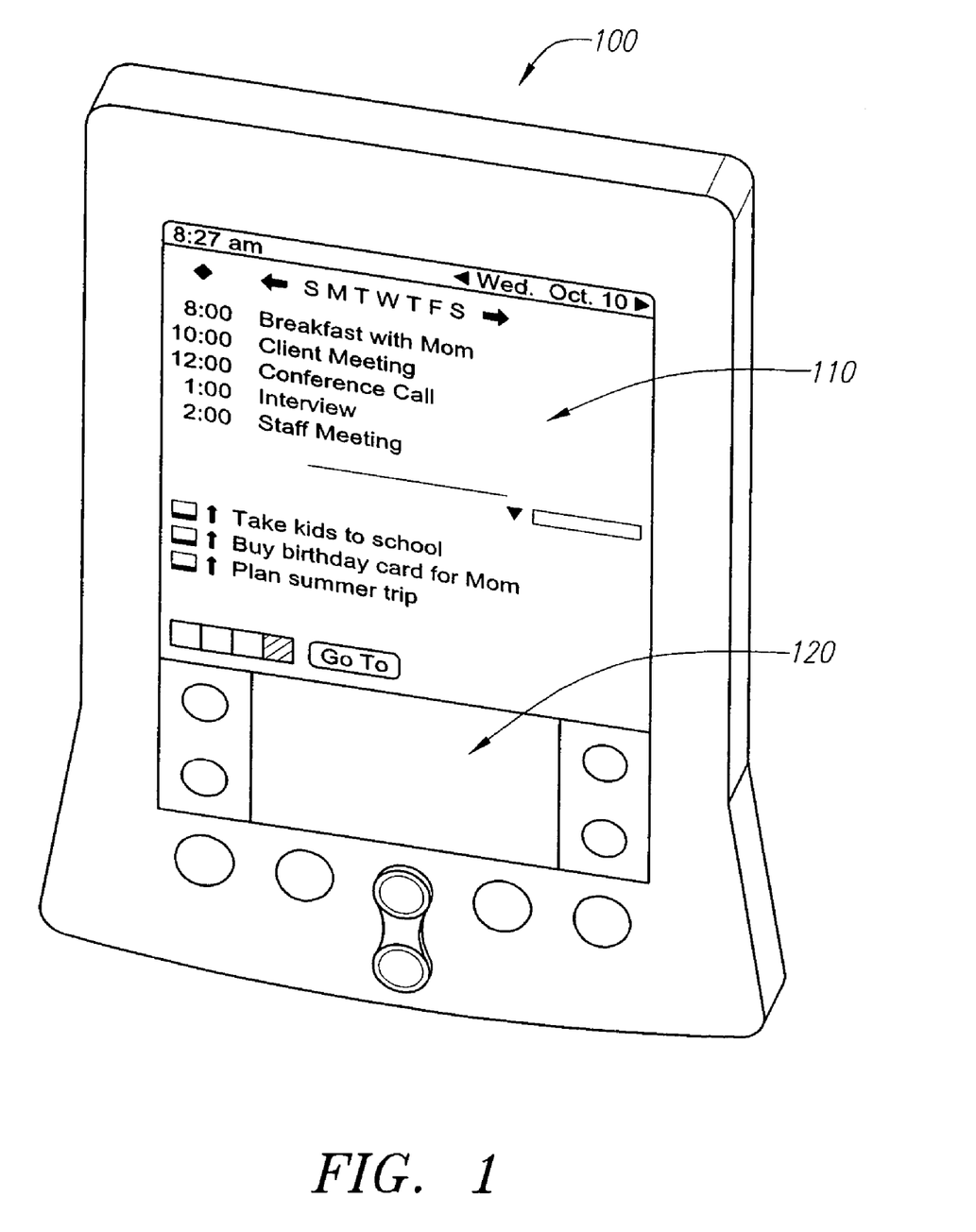
FIG. 1 is a Palm™ handheld computer.

The most popular brand of PDA is the Palm™. However, the Palm™ is much more than a simple PDA. A basic configuration of the Palm™ 100 is shown in FIG. 1. This small, slim, device, about the size of your wallet, can hold 6000 addresses, 5 years of appointments, 1500 to-do items, 1500 memos, 200 e-mail messages, and can run many different software applications.

The front of the PalmR3 100 is a large LCD screen 110 which is touch-sensitive and allows a user to enter and manipulate data. A stylus (not shown) is provided with the Palm™ to help in making touch screen inputs. By using the stylus (or another handheld pointer) to interact with a touch-sensitive screen, a palmtop user can easily navigate through a host of built-in programs, software, and other applications.

Today, the Palm™, PDA and other handheld computing devices offer Internet connectivity capabilities, as well as a vast array of hardware and software choices. Palmtops have evolved from simple organizers into a new kind of handheld that people use to instantly manage all kinds of information, from email, to medical data, to stock reports.

Mobile telephones (cell phones, PCS, satellite phones, etc) are also common tools in today's world. Many cell hones include rudimentary functionality for maintaining call lists, or phone book information, to help alleviate the burdens associated with managing contacts and tracking phone numbers.

However, despite the great capabilities and conveniences of the modern PDA, and the cell phone, many innovations are needed for expanding the capabilities and for increasing the convenience of using PDAs and cell phones.

SUMMARY OF THE INVENTION

The present inventors have realized that the integration of mobile telephone technology into a PDA is one area where innovations are greatly needed to improve the performance, convenience, and usability of PDA and/or other devices having mobile telephone capabilities. The present inventors have also realized that the integration of cell phones into a PDA have some drawbacks that make operation of the combined devices less efficient. For example, a PDA having an integrated cell phone has more processing capability than needed, if the cell phone is simply added to the PDA. A PDA having integrated cell phone capability which uses a single processor to run both the cell phone and PDA is subject to invalid, spurious, rogue, or hacker initiated signals if the PDA processor runs user programs and controls the radio functions of the cell phone.

The present invention is a PDA or other electronic device having integrated cell phone technology. The user interfaces for the cell phone and the PDA are run on a single main processor (PDA processor, for example). A second, phone control processor controls the radio functions of the cell phone. A proprietary link is established for communications between the PDA processor and phone control processor. The proprietary link isolates the phone control processor and radio equipment of the cell phone from spurious commands instituted because of hacker's programs, program crashes, etc., that occur on the PDA processor.

The invention may be embodied as a handheld computer or electronic device comprising, a display screen, a first processor configured to run user applications and send outputs of the user applications to the display screen, the user applications including a telephone user interface configured to capture user inputs for telephone related operations and display current telephone operations information on the display screen, a telephone device, a baseband processor connected to the telephone device and configured to control operations of the telephone device, and a communications link between the first processor and the baseband processor for communicating user inputs and selections from the telephone user interface to the baseband processor.

The invention includes an electronic device comprising display means, a first processing means for running user applications and sending outputs of the user applications to said display screen, said user applications including a user interface means for at least capturing user inputs for telephone related operations and displaying current telephone operations information on said display means, a telephone communication means, a baseband processing means for controlling operations of said telephone communication means, and a link means for communicating data between said first processing means and said baseband processing means, said data including user inputs and selections from said user interface means to said baseband processing means.

The present invention includes a method of operating an electronic device having an integrated telephone device, comprising the steps of, running a telephone user interface program on a first processing device, running a telephone device control program on a second processing device, communicating user data and actions from the telephone user interface program to the telephone device control program via a communications link between the first processor and the second processor, and controlling operation of the integrated telephone device via the telephone device control program according to the user data and actions communicated.

Portions of the present invention may be conveniently implemented on a general purpose computer, such as a modern PDA, Palm™, cell phone, satellite phone, or networked computers, and the results may be displayed on an output device connected to any of the general purpose, PDA, Palm™, networked computers, or transmitted to a remote device for output or display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 2:
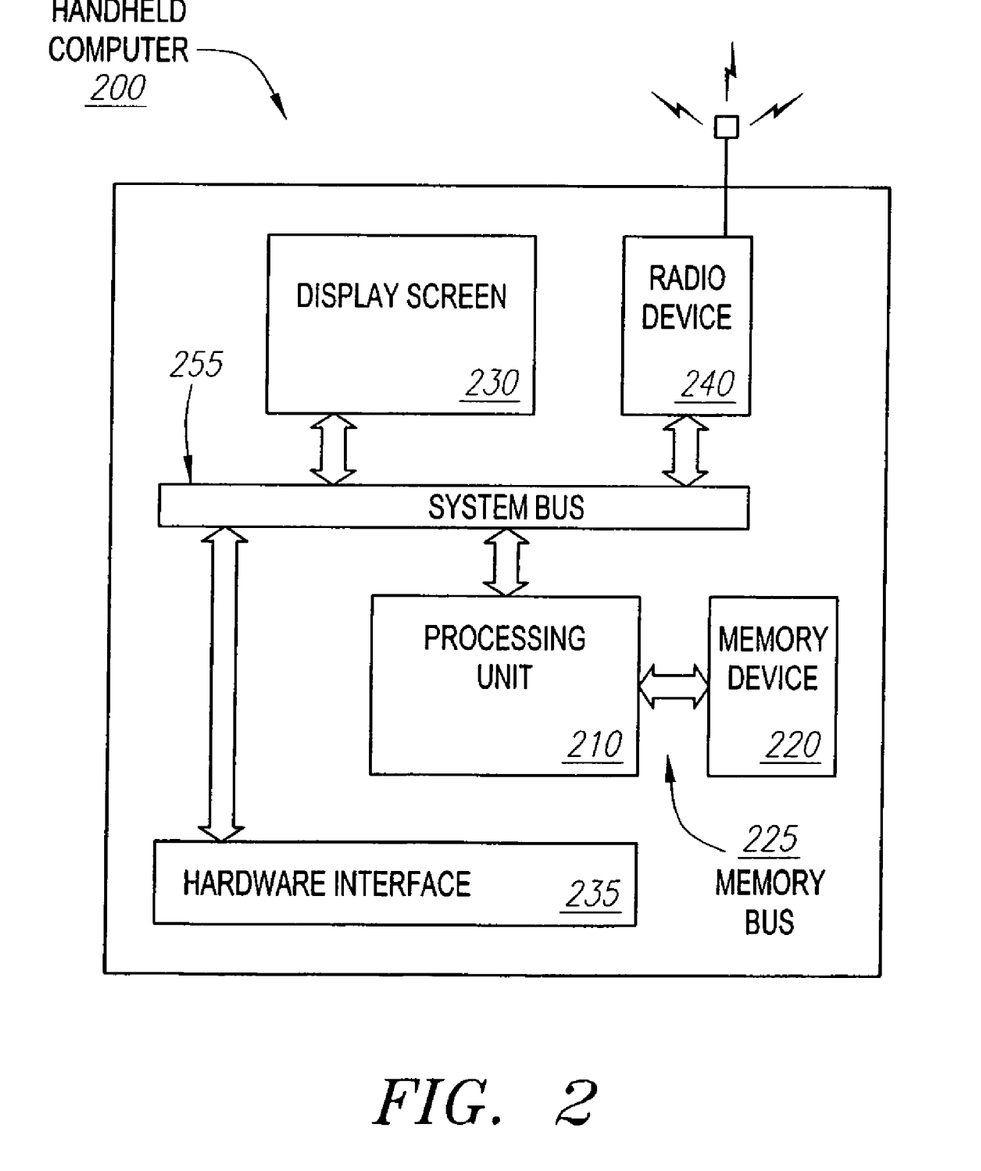
FIG. 2 is a block diagram of selected components of a possible design integrating cell phone technology into a PDA device.

Referring again to the drawings, wherein like reference numerals designate identical or corresponding parts, and more particularly to FIG. 2 thereof, there is illustrated a block diagram of selected components of a handheld computer 200 that includes cell phone technology. The handheld computer 200 includes a processing device 210, for executing applications and an operating system of the computer 200, a memory device 220 for storing the operating system, data, and the applications. A memory bus 225 is utilized to transfer programs and data from memory to the processing unit 210.

A display screen 230 is provided (preferably a touch sensitive screen) for display of Operating System prompts, buttons, icons, application screens, and other data, and for providing user inputs via tapping or touching (or drawing in the Graffiti" area 120) via a stylus or other touch mechanism. Hardware interface 235 connects to physical hard buttons and switches located on a body of the computer 200 and provides signals to applications running on the processing unit 210.

A mobile radio device 240 provides connectivity to a cellular telephone network (not shown). A system bus 255 carries data and commands to/from the processing unit 210 from/to other devices within the computer 200. For example, user applications running on the computer 200 send application screens and other data outputs to display screen 230 for display via the system bus 255. User inputs (Graffiti" area drawing, or tap selection, for example) are detected by the screen 230 and sent to the processing unit 210 via the system bus 255.

In addition to the operating system and user selected applications, another application, a phone device, executes on the processing unit 210. Phone calls from the network directed toward the mobile radio device 240 are detected by the mobile radio device and sent, in the form of an incoming call notification, to the phone device (executing on the processing unit 210). The phone device processes the incoming call notification by notifying the user by an audio output such as ringing (not shown).

The phone device also includes a method for the user to answer the incoming call. For example, tapping on a phone icon, or pressing a hard button designated or preprogrammed for answering a call signals the phone device to send instructions (via system bus 255) to the mobile radio device 240 to answer the call.

Outgoing calls are placed by a user by entering digits of the number to be dialed and pressing a call icon, for example. The dialed digits are sent to the mobile radio device 240 along with instructions needed to configure the mobile radio device 240 for an outgoing call. The instructions may include, for example, 1. Access a base station, 2. Send digits, 3. Retrieve and forward ring indication (if any), 4. Connect call, 6. manage call, and 7. await further instructions. Many other instructions may be utilized. For example, in the AT command set more than 100 commands are available. Similar instructions may be sent for handling an incoming call by the phone device after receiving and processing an incoming call indication from the mobile radio device 240.

The mobile radio device 240 is a device configured send signals on exact frequency requirements (FCC certified, for example). Base stations that communicate with the mobile radio device 240 are also precision devices sending and receiving on specified radio frequency channels. One difficulty arising with the design as shown in FIG. 2 is that application program crashes on processor 210 can cause unwanted or inconsistent signals to be generated on system bus 255 and potentially causing problems with the mobile radio device 240, such as spurious radio emissions. In addition the design of FIG. 2 also is susceptible to hacker or rogue programs that may be executing on processing unit 210, also potentially causing spurious radio emissions from mobile radio device 240. The potential spurious emissions, might, for example, cause radio broadcasts in an unintended or unapproved frequency range, potentially cause problems at one or more base stations (unintentionally causing a base station re-boot, for example), or cause interfere with other mobile radio devices.

Figure 3:
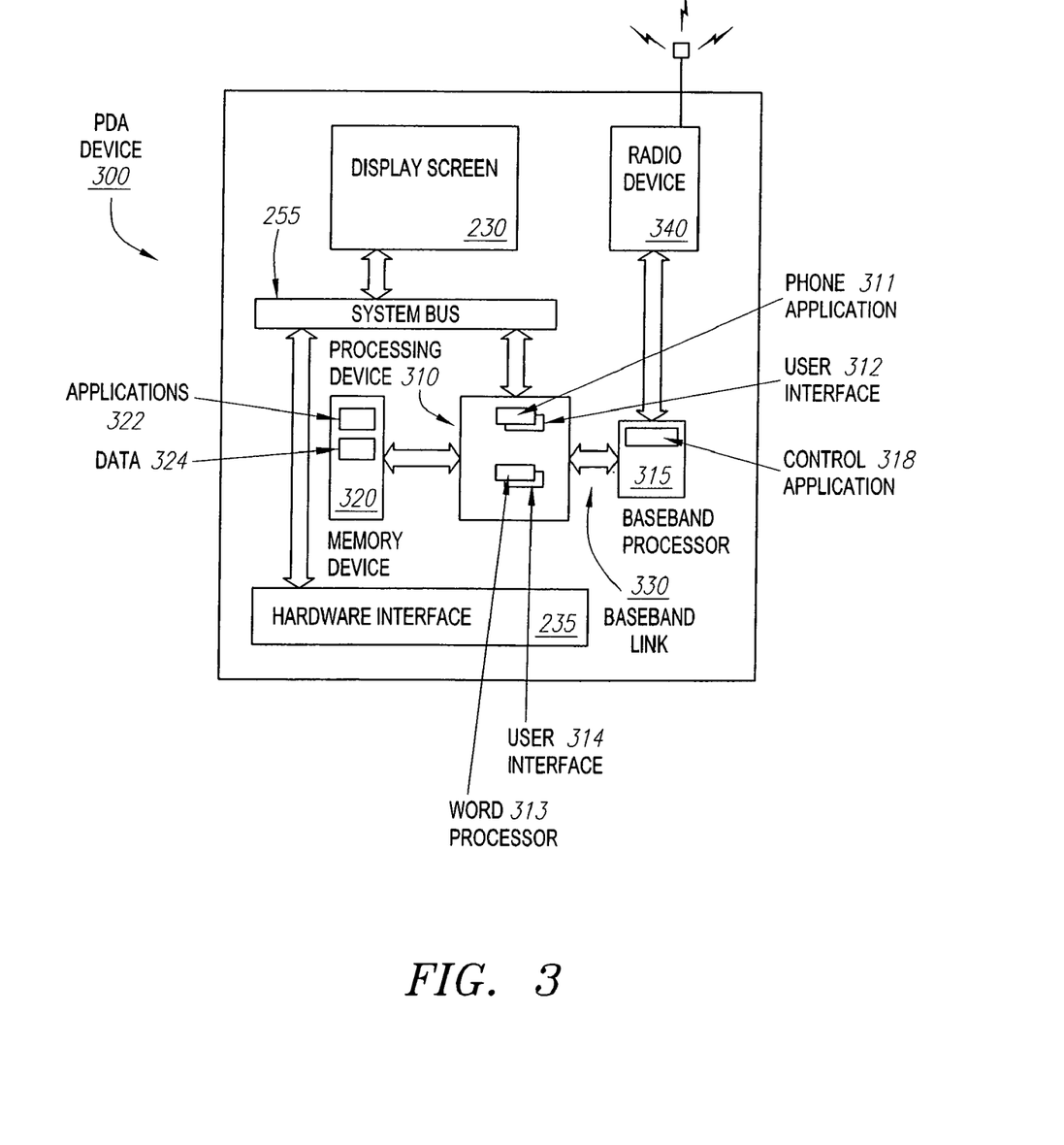
FIG. 3 is a block diagram of selected components of a design according to an embodiment of the present invention for integrating cell phone technology into a PDA device.

FIG. 3 is a block diagram of selected components of a design according to an embodiment of the present invention for integrating cell phone technology into a PDA device 300. The PDA device 300 is a handheld computer such as a Palm™, Palm III™, or Palm V™, or Palm VII™ organizers, manufactured by Palm, Inc. Other embodiments of the invention can include Windows CE™ and Visor™ handheld computers, or other handheld computers and personal digital assistants (PDAs).

Preferably, the PDA 300 has interactive hardware and software that perform functions such as maintaining calendars, phone lists, and at least one voice or audio related functions integrated or attachably integrated (via a connector device, for example, not shown) so as to be configured for use with cellular telephone capabilities of the PDA. Several examples of a configuration and details of connector devices for connecting or integrating voice function devices to a PDA are described in Maes et al., application Ser. No. 09/675,872, entitled, "INTEGRATING VOICE FUNCTION INTO A PDA," filed Sep. 29, 2000, the contents of which are incorporated herein by reference in their entirety.

The software, including a phone user interface, operating system, and other applications (word processors, spreadsheets, databases, etc.) 322 are stored in memory device 320, along with program data, graphics, and other data 324, and executed on a processing device 310. A touch sensitive display device 230 and hard button interface 235 are also provided as similarly discussed above. A system bus 255 provides data, command, and possibly other types of communication, as directed, by any one of the devices, including display screen 230, hardware interface 235, and processing unit 310, to the other devices.

Processing unit 310 runs applications, including the operating system (OS, including a User Interface (UI) of the OS), and other user applications (word processor 313 and word processor user interface 314, for example) as directed by user inputs. The user applications display outputs on the display screen 230 and receive inputs from taps, tap & hold, and writing operations on the display screen and from programmed hard buttons attached to hardware interface 235.

FIG. 3 includes a mobile radio device 340, and a phone control processor 315. The mobile radio device 340 receives instructions and other control data from the phone control processor 315 (also referred to as a baseband processor), implementing those instructions and using the data so as to operate the mobile radio device 340. The phone control (baseband) processor 315 sends instructions and data to the mobile radio device based on programming of a phone control application 318.

A phone application 311 and phone application user interface 312 are provided and execute on the processing unit 310. The main function of the phone application 311 is to service the phone application user interface 312 and transfer required data to and from the phone control application 318 running on the phone control (baseband) processor 315.

A PDA/baseband link 330 is used to communicate data between the phone application 311 (on processing unit 310) and the phone control application 318 (on phone control (baseband) processor 315). The PDA/baseband link 330 is an AT Command interface over a serial link. The PDA/baseband link 330 separates processing performed on processing unit 310 and processing performed on the phone control (baseband) processor 315, providing a separation that reduces chances that a hacker program, other rogue application, or a program crash on the processing unit 310 has any improper influence on the phone control (baseband) processor 315 or the phone control application 318, hence providing a more stable environment for operation of the mobile radio device 340 and assuring no adverse impact on the operation of the cellular network (e.g., preventing unwanted interference signals that could adversely affect other users).

In one embodiment, the AT Command over serial link used on the PDA/baseband link 330 is proprietary to Palm™ and/or utilizes other protocol stacks. In other embodiments, the PDA/baseband link 330 is a parallel interface. In the embodiments using a proprietary link (proprietary protocol and/or proprietary protocol stack), the format of the important over and above proprietary link is not particularly normal protocol considerations (byte economy, ease of use, etc), but keeping the link proprietary assures that rogue applications affecting operation of other PDA devices are unlikely to have the present invention. The protocol that is updateable any effect on a device according to PDA/baseband link 330 includes a by downloading an updated protocol from a vendor web site and installing the updated protocol on each of the processing unit 310 and phone control (baseband) processor 315.

The type of interface used over the PDA/baseband link 330 may be selected based on criteria of the phone control (baseband) processor 315 which may already have communication ports configured for either parallel or serial communications. The selected protocol is a choice between the available protocols for a particular baseband processor, or a protocol that may be developed by the producer of the baseband processor and the producer of a device utilizing the present invention. No advantage in the type of protocol utilized is envisioned, except that an industry standard protocol (such as the AT command interface discussed above) may be more familiar to development engineers implementing a product, and may reduce development time.

Figure 4:
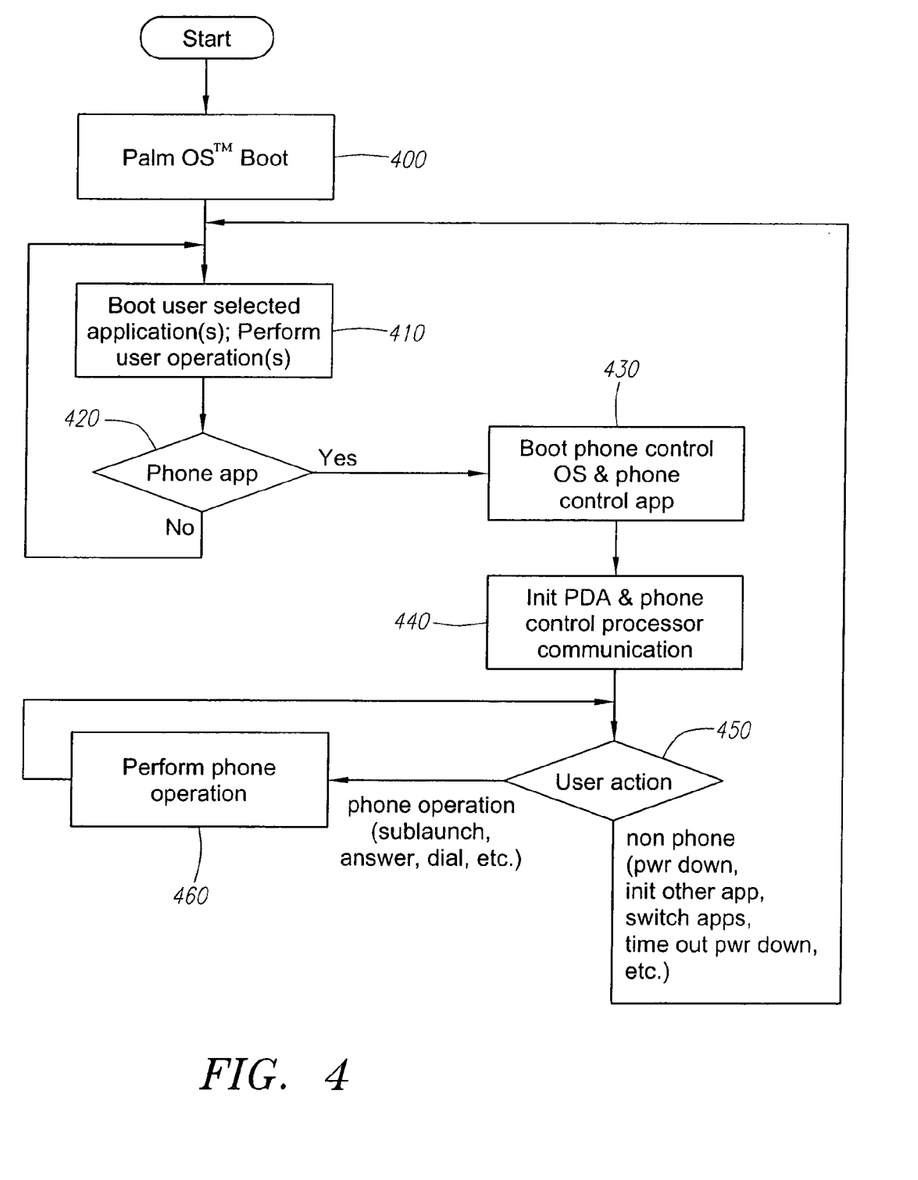
FIG. 4 is a flow chart illustrating process flows of a main PDA processor executing PDA and cell phone user interfaces.

FIG. 4 is a flow chart illustrating process flows of a main PDA processor executing PDA and cell phone user interfaces. At step 400, the system (handheld computers, Palm™, etc.) is powered on and the Palm™ OS is booted. The Palm OS™ is used as an example, other handheld or full service operating systems (NT, Windows, Linux, etc.) may be utilized. Steps 410 and 420 are combination steps.

At step 410 any user operation may be performed (power down, set preferences, arrange icons, etc.) or user selected application (word processor, Internet, etc.) may be invoked and used. Step 420 identifies that the user has selected a phone application that is intended to control mobile phone capabilities built into the system (mobile radio 340, for example).

When the phone application is started, it sends a signal across the PDA/baseband link 330 that signals the phone control OS to boot and start a phone control application that runs on the phone control processor (step 430). Alternatively, the phone control OS is booted upon power up of the system and waits in a hibernation state until a signal is received to start the phone control application. In the former case, an on/off recognizer identifies whether a signal on the PDA/baseband link 330 is an on/off command and boots or shuts down the phone control OS and processor accordingly. In the latter case, the phone control OS recognizes start and shut down commands that are applied to the phone control application.

Once started, the PDA processor unit and phone control processor begin communicating from phone application to phone control application over the PDA/baseband link 330 (step 440). User actions (step 450) controlling PDA functions or directly phone operations (step 460) are implemented.

Figure 5:
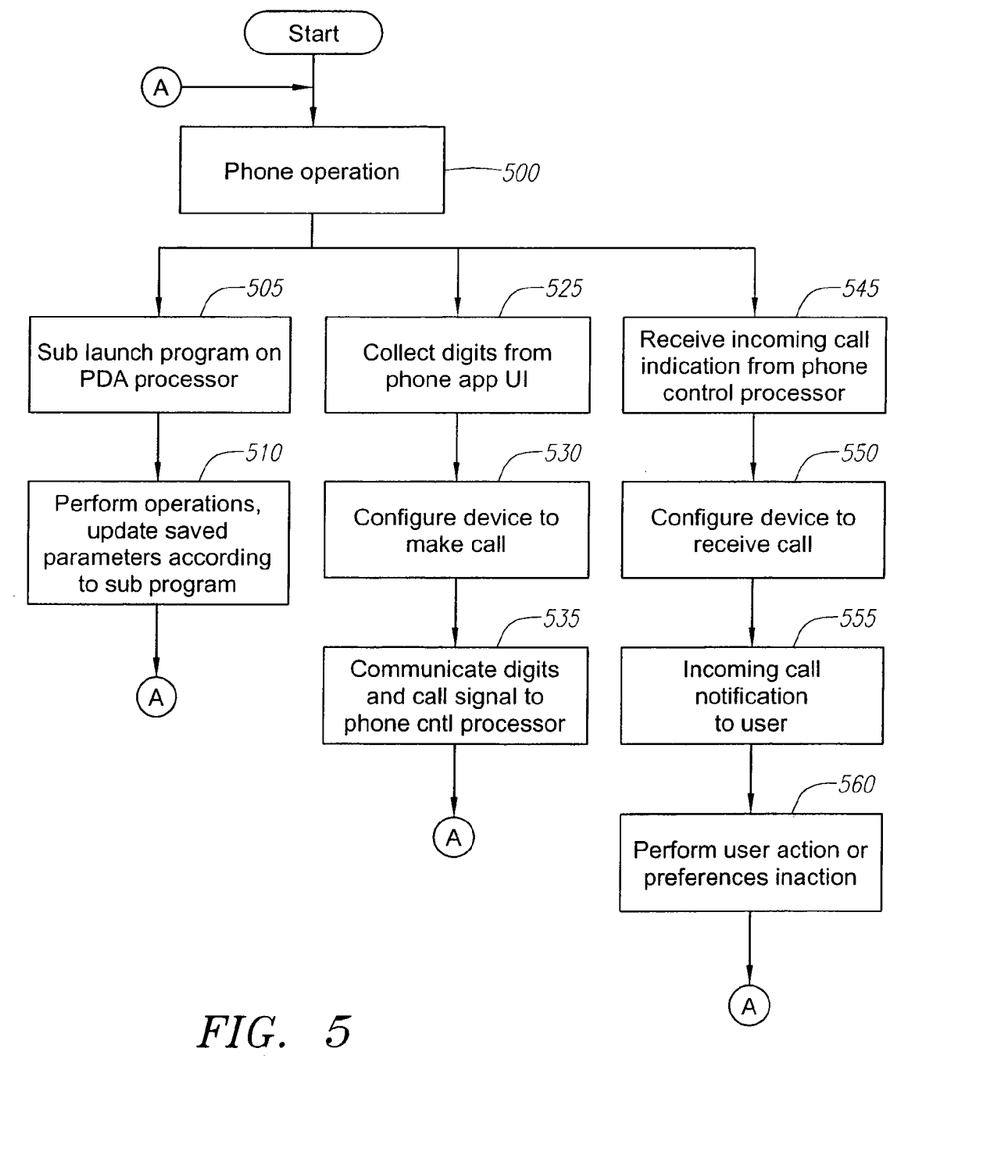
FIG. 5 is a flow chart illustrating an embodiment of process flows of a cell phone user interface and communications of the cell phone user interface to a phone control processor according to the present invention.

FIG. 5 is a flow chart illustrating some example phone operations. The user initiates various phone operations (step 500) by tapping phone application icons, graphics, enters control data into the Graffiti™ area, or other input method (attached keyboard, hard buttons, etc. ). Phone operations may include, for example, sub-launching a phone related application (step 505) and performing the sub-application processed (sub-launching an address book or note taking function (step 505), and updating/creating an address book entry or taking/updating a note (step 510), for example. One example of a note taking application is described in Maes et al., U.S. Pat. No. 6,442,251, application Ser. No. 09/675,363, entitled, "METHOD AND APPARATUS FOR TAKING A NOTE WHILE IN A CALL," filed Sep. 29, 2000, the contents of which are incorporated herein by reference in their entirety.

Another example phone operation is making a call, illustrated in steps 525-535. First, the phone application collects digits entered by the user via the phone application user interface (running on PDA processing unit 310) (step 525). A step of sending a wake up or configuration signal (step 530) to the phone control application (running configuration signal (step 530) to the phone control application (running on phone control processor 315) may be performed to "wake" the phone control application 318 (in the case where the phone control application 318 is in a sleep mode from a period of in-operation, for example) and signal the phone control application 318 to configure the mobile radio device 340 so as to be ready to make a call (power up, awake form sleep, etc.). Step 530 may be performed as soon as the phone application knows that a call is being made, such as upon phone application boot, or when a first digit of a phone number is received (as in step 525, for example). At step 535, the digits collected at step 525 are communicated from the phone application to the phone control application, signaling the phone control application to initiate a call to that number.

Another example phone application is receiving an incoming call as illustrated in steps 545-560. At step 545, an incoming call indication is received by the phone application from the phone control application (running on ph call processor). At step 550, the phone application is configured to receive the call (set up audio channels, "wake" phone applications, etc.). At step 555, the phone application presents an incoming call notification to the user (ringing, vibration, visual display, combination, etc.). Finally at step 560, a user acts to answer the call (presses a talk button or icon, for example), which directs the phone application to connect the call, or, a user acts to send the call to voicemail (or ignore), by pressing an end button or icon, for example. Alternatively, if a user does nothing, the call is left unattended (call directed to voicemail by network, for example), or, if the user has preferences set, the preferences are used to direct operations of the phone application. Examples of user preferences for directing phone operations during periods of user inaction (and other conditions, such as how to notify a user of an incoming call) are described in Maes et al., application Ser. No. 09/675,874, entitled, "METHOD AND APPARATUS FOR SETTING AND USING USER PREFERENCES," filed Sep. 29, 2000, the contents of which are incorporated herein by reference in their entirety.

Figure 6:
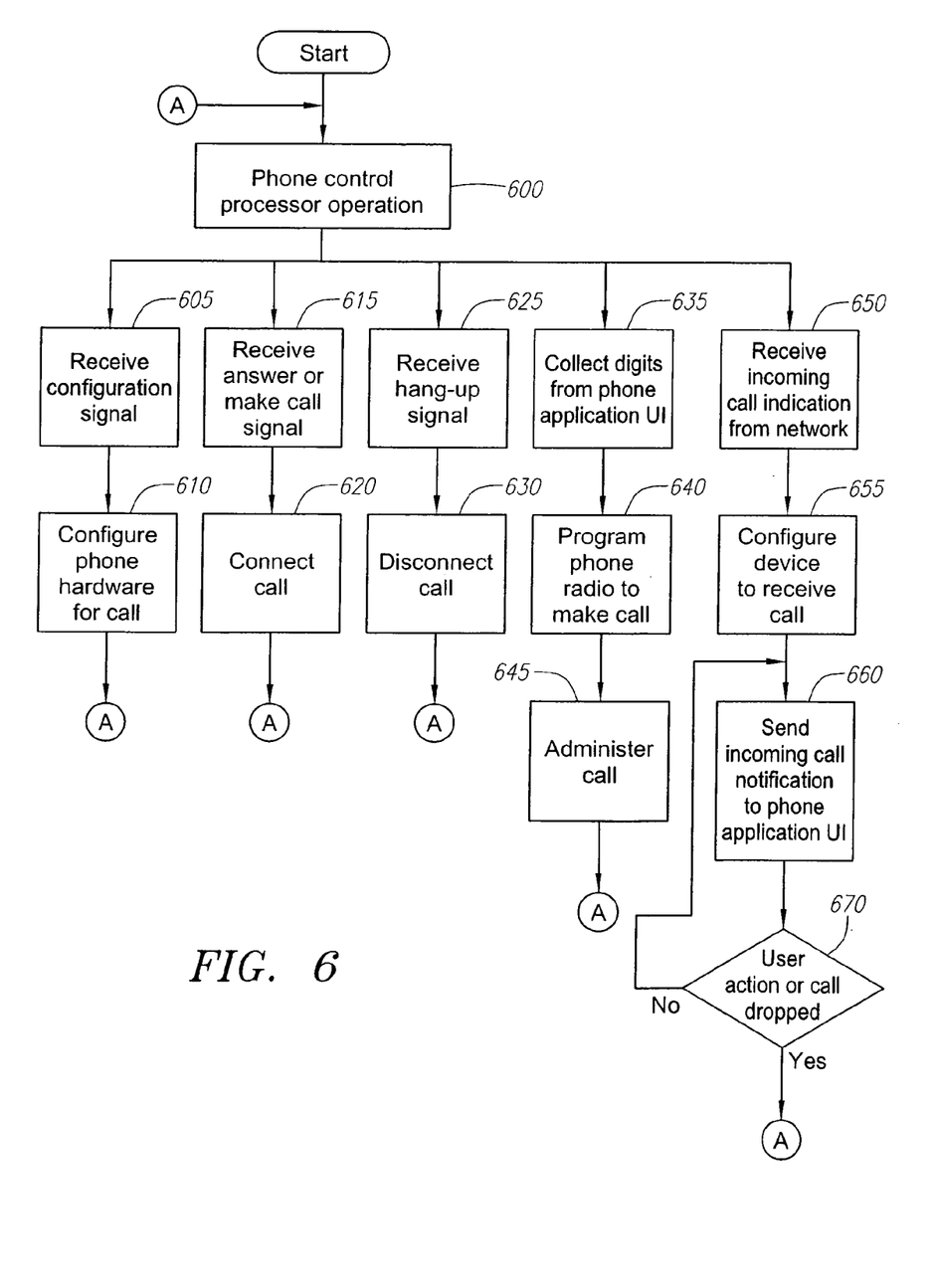
FIG. 6 is a flow chart illustrating an embodiment of a phone control program according to the present invention.

FIG. 6 is a flow chart illustrating an embodiment of a phone control program according to the present invention. Several processes are shown, as sequential processes initiated by an event or control signal. One example operation, configuring the mobile radio device 340 to make a call, is initiated, for example, by a control signal received (step 605) via the PDA/baseband link 330 from the phone application. The phone control processor 315 performs the configuration (step 610). Another example includes signals received by the phone control processor directing it to answer a call (step 615), and the operations of the control processor needed to connect the call (step 620) are performed. Similarly, a signal may be received to hang-up a current call (step 625), and the phone control processor disconnects the current call accordingly (step 630).

Another example operation of the phone control processor is shown in steps 635-645, for making a call. The phone control processor receives a communication from the phone application having the digits of a user entered telephone number (step 635), the phone control processor programs the mobile radio device 340 to contact a base station and initiate the call (step 640), and the phone control application administers (performs any functions needed to maintain the connection) the call (step 645).

A final example operation, answering an incoming call, is illustrated in steps 650-670. An incoming call indication is received from the network (step 650). The phone control processor configures the mobile radio device to answer the call (step 655) and sends an incoming call notification to the phone application (step 660). If a user action prompted action message (hang-up, send to voicemail, or answer, for example) is returned from the phone application, a phone control application process is then initiated (downstream from connector A) to perform that process. If no user action is occurs, the incoming call notification is resent (no branch of Step 670).

Alternatively, the phone application is pre-programmed to continue any ringing (or other notification) until a lost call signal is received from the phone control application indicating that there is no longer an incoming call (already diverted to voice mail by the network, or caller hung-up, for example). The above processes are examples, and other features or processes may also be performed by the phone control processor (periodic network checks, or sending network ID information to the phone application, for example).

Figure 7:
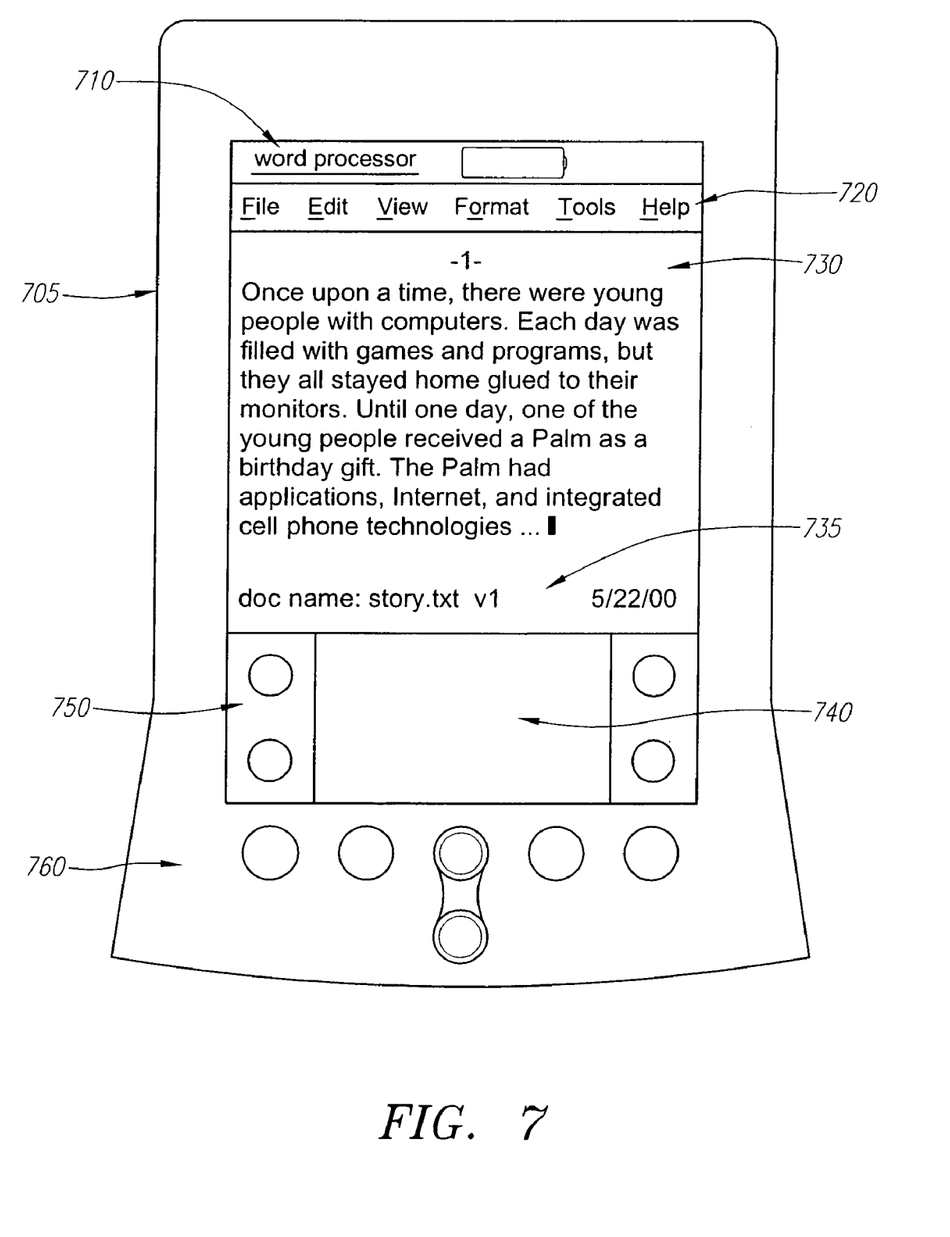
FIG. 7 is an electronic device running a PDA application according to an embodiment of the present invention.

FIG. 7 is an electronic device running an example PDA application according to an embodiment of the present invention. The example PDA application is a word processor 705 that runs on processing unit 310. The word processor includes an identification banner 710, a set of pull down menus 720 for file management and other features of the word processor 705. The document being processed 730 is displayed, and user inputs are received via tapping the touch sensitive screen, writing or other actions in the Graffiti" area 740, tapping virtual buttons 750, or pressing one or more hard buttons 760 (some of which may be connected via Hardware interface 235 and initiating a specific function of the word programmed for processor, for example). The document being processed is saved as story1.txt (as shown by document identifier 735) in memory device 320.

Figure 8:
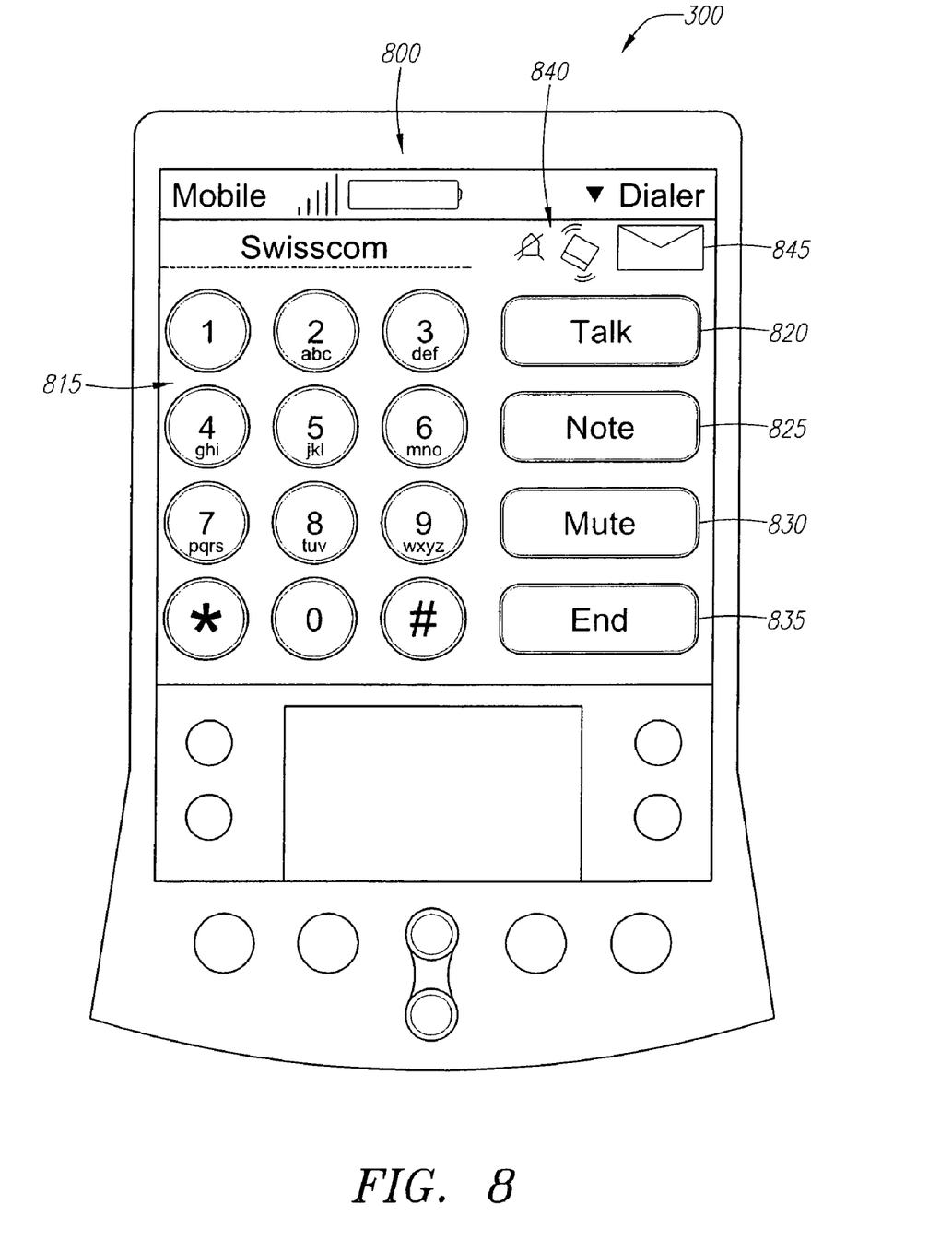
FIG. 8 is an electronic device running a phone application according to an embodiment of the present invention.

Concurrently hosted on the Palm™ (or electronic or computer device) 300 is the phone application. An example phone application 800 is shown in FIG. 8. The phone application 800 includes a dialer screen 815 that includes keypad digits 1-9, *, and #, and a set of operation keys. The operation keys include Talk 820, Note 825, Mute 830, and End 835. In one embodiment, user activation of the Talk key 820 initiates a phone call of previously entered digits, or answers an incoming call. User activation of the Mute key 830 mutes the caller at the other end of the line (other caller), which keeps the other caller from hearing any conversation initiated at the users side of the call. User activation of the End key 835 terminates the call that the user is currently participating, or immediately transfers an incoming call to voicemail other opt ions as specified in user preferences, for example). Other functions may be assigned or programmed into the keys, and additional or alternative keys and functions may also be provided. The Palm OS™ (or other operating system) decides which of the concurrent applications is currently being executed on the processing device 310, the remain application(s) in an inactive state.

While on a call, the Note key 825 activates an in-call note taking service, allowing the user to take notes about the call and return to the dialer screen for control of other telephone options after completing the note. Details of a note taking program and other options are described in co-pending U.S. patent application Ser. No. 09/675,363, entitled "METHOD AND APPARATUS FOR TAKING A NOTE WHILE IN A PHONE CALL," filed Sep. 29, 2000, the contents of which are incorporated by reference in their entirety.

A voicemail flag 845 (envelope icon, for example) indicates a voicemail or other message (short messaging service, for example) received by the phone application or network administering the telephone capabilities of the Palm™ 300. Ringer preferences are shown as two icons 840 (a bell with a line drawn through it, and a vibrator icon) illustrating the current options for notification of incoming calls. Either the bell icon or vibrator icon may be tapped to change the status of the option. For example tapping the bell with a line drawn through it changes it to bell without a line. Tapping the vibrator icon changes it to a no vibrate icon. In this manner, user preferences, or options, may be changed. The phone application 810 is one example of a phone application that may be utilized in conjunction with the present invention. However, it should be understood that variations and/or other phone applications may be utilized.

FIGS. 7 and 8 illustrate concurrent applications, and their respective user interfaces, executing on the processing unit 310. However, control of the mobile radio device 340 is maintained by the phone control processor, and the phone control application. In effect, separating user applications and interfaces and the phone application user interface from having any influence over the operation of the phone control application, thereby isolating the phone control application for any ill effects of a rogue application or program crash on the processing unit 310.

Although the present invention has been described using the specific example of integrating phone and PDA user interfaces on one processor and maintaining phone control on a separate processor, the invention may be applied to applications other than phone and PDA based systems. For example, combining a wireless internet device (replacing 340) and another electronic device (e.g., PDA, electronic inventory system, etc.), or any other wireless communication system and another electronic device, each having a user interface.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMs, micro-drive, and magneto-optical disks, ROMs, RAMS, EPROMs, EEPROMs, DRAMS, VRAMs, flash memory devices (including flash cards), magnetic or optical cards, nanosystems (including molecular memory ICs), RAID devices, remote data storage/archive/warehousing, or any type of media r device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, placing and receiving telephone calls, transferring audio and voice data, serial, parallel and proprietary communications between processors, user interfaces, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. An electronic device integrating user applications and a user interface to a telephone device, comprising:
   a first processor for executing one or more user application programs and a user interface program for the telephone device;
   a second processor for executing control operations of the telephone device; and
   a communication link coupling said first processor and said second processor for transferring data and command signals from the user interface within the first processor to the second processor, said communication link isolating the control operations of the telephone device from interference by any spurious data and command signals that are received in connection with executing operations of the user application programs on the first processor.

2. The electronic device of claim 1 wherein said first processor has a memory device.

3. The electronic device of claim 2 wherein said memory device is configured for storing an operating system for the electronic device and said user applications.

4. The electronic device of claim 1 wherein said communication link is proprietary and configured to operate with the electronic device.

5. The electronic device of claim 4 wherein said communication link is a proprietary protocol.

6. The electronic device of claim 5 wherein said communication link is a proprietary protocol stack.

7. The electronic device of claim 5 wherein said communication link is a proprietary protocol that is updateable from outside the electronic device.

8. The electronic device of claim 7 wherein said communication link is updateable from a remote device separate from the electronic device.

9. The electronic device of claim 1 wherein said communication link comprises a protocol suite.

10. The electronic device of claim 1 wherein said communication link prevents the spurious data and command signals from adversely affecting telephone operations executed by said second processor.

11. The electronic device of claim 1 wherein said communication link prevents rogue applications from affecting the telephone operations executed by the second processor.

12. An electronic device integrating general purpose computing operations and telephonic operations, comprising:
    a display screen;
    a first processor for executing user applications and sending output signals of the user applications to the display screen;
    a second processor for executing telephone operations;
    a link between the first processor and the second processor for communicating data between the first processor and the second processor, the link preventing communication of unwanted signals generated or received by the first processor between the first processor and the second processor.

13. The electronic device of claim 12 wherein the first processor has a memory device.

14. The electronic device of claim 13 wherein the memory device is configured for storing an operating system and said user applications.

15. The electronic device of claim 12 wherein the link is proprietary.

16. The electronic device of claim 15 wherein the link is a proprietary protocol.

17. The electronic device of claim 16 wherein the link is a proprietary protocol stack.

18. The electronic device of claim 16 wherein the link is an updateable protocol.

19. The electronic device of claim 18 wherein the link is updateable from a remote device.

20. The electronic device of claim 12 wherein the link prevents the unwanted signals generated in connection with execution of the user applications from being communicated to affect the operations of the second processor.

21. The electronic device of claim 12 wherein the link prevents rogue applications from affecting the operations of the second processor.

22. A single electronic device integrating telephonic functions, comprising:
    a first processor configured to execute a telephone user interface that captures user inputs for telephone related operations and displays current telephone operations information;
    a baseband processor connected to a telephone device that separately controls operations of the telephone device; and
    a communications link between the first processor and the baseband processor for communicating user input from the telephone user interface to the baseband processor, wherein the communications link is a protocol stack that isolates the baseband processor from harmful commands associated with the first processor.

23. The electronic device of claim 22, wherein the protocol stack further isolates the baseband processor from harmful commands that arise from at least one of: a hacker program and a program crash.

24. The electronic device of claim 22, wherein the stack prevents spurious radio emissions from the telephone device that can be the result of at least one of a hacker program and a program crash.

25. The electronic device of claim 24, wherein the protocol stack is proprietary.

26. The electronic device of claim 22, wherein the protocol stack is associated with an AT command set.

27. The electronic device of claim 22, wherein the harmful commands associated with the first processor arise from a crash of the first processor.

28. The electronic device of claim 27, wherein the harmful commands associated with the first processor arise from a rogue application on the first processor.

29. The electronic device of claim 22, wherein the protocol stack is updatable from a remote device.

30. The electronic device of claim 22, wherein the communications link is one of a serial or a parallel link.

31. A method for operating general purpose computer user applications and a user interface to a telephone device on a single device, comprising the steps of:
    executing one or more user application programs and a user interface program for the telephone device on a first processor;
    executing control operations of the telephone device on a second processor; and
    providing a communication link between the first and second processor for transferring data and command signals from the user interface within the first processor to the second processor to isolate the control operations of the telephone device from interference by any spurious data and command signals that are received in connection with executing operations of the user application programs on the first processor.

32. A method according to claim 31, further comprising the step of:
    providing a memory device for the first processor.

33. A method according to claim 31, further comprising the step of:
    storing an operating system for the electronic device and the user applications.

34. A method according to claim 31, further comprising the step of:
    configuring the communication link to be flexible to operate with a protocol that may be downloaded from a remote device.

* * * * *